(12) United States Patent
Thyamagundalu et al.

(10) Patent No.: US 9,930,149 B2
(45) Date of Patent: Mar. 27, 2018

(54) MULTICAST TRAFFIC DISTRIBUTION IN A MULTI-POD NETWORK ENVIRONMENT

(71) Applicant: CISCO TECHNOLOGY, INC., San Jose, CA (US)

(72) Inventors: Sanjay Thyamagundalu, Sunnyvale, CA (US); Mahesh Shirshyad, San Jose, CA (US); Nikhil Gopinath Shetty, Milpitas, CA (US); Siva Gaggara, Sunnyvale, CA (US); Bharat Kumar Bandaru, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 380 days.

(21) Appl. No.: 14/667,474

(22) Filed: Mar. 24, 2015

(65) Prior Publication Data

US 2016/0285932 A1  Sep. 29, 2016

(51) Int. Cl.
*H04L 29/06* (2006.01)
*H04L 29/08* (2006.01)
*H04L 12/46* (2006.01)
*H04L 29/12* (2006.01)
*H04L 12/64* (2006.01)

(52) U.S. Cl.
CPC .......... *H04L 69/22* (2013.01); *H04L 12/4625* (2013.01); *H04L 12/4633* (2013.01); *H04L 12/6418* (2013.01); *H04L 61/2069* (2013.01); *H04L 69/324* (2013.01)

(58) Field of Classification Search
CPC ... H04L 69/22; H04L 69/324; H04L 12/4625; H04L 12/4633; H04L 12/6418
See application file for complete search history.

(56) References Cited

U.S. PATENT DOCUMENTS

| | | | |
|---|---|---|---|
| 8,483,096 B2 | 7/2013 | Amin et al. | |
| 2003/0046539 A1* | 3/2003 | Negawa | H04L 9/0822 713/163 |
| 2012/0226789 A1 | 9/2012 | Ashok et al. | |
| 2012/0226799 A1 | 9/2012 | Sukhdev | |
| 2013/0107885 A1* | 5/2013 | Kotalwar | H04L 45/00 370/392 |
| 2013/0329727 A1* | 12/2013 | Rajagopalan | H04L 12/4641 370/390 |
| 2014/0198661 A1* | 7/2014 | Raman | H04L 47/125 370/236 |

* cited by examiner

*Primary Examiner* — Feben M Haile
(74) *Attorney, Agent, or Firm* — Polsinelli PC

(57) ABSTRACT

An example method for to multicast traffic distribution in a multi-pod network environment is provided and includes provisioning a block of multicast group addresses for broadcast, unknown unicast and multicast (BUM) traffic distribution between pods in the multi-pod network, calculating a hash corresponding to a bridge domain (BD) extending across a plurality of pods in the multi-pod network, the hash being identically calculated at each one of the plurality of pod, indexing with the hash into the block of multicast group addresses designated for inter-pod BUM traffic to derive a global multicast group identical for the broadcast domain across the plurality of pods, and associating a local multicast group at the translator with the derived global multicast group.

20 Claims, 5 Drawing Sheets

MULTICAST TRAFFIC DISTRIBUTION IN A MULTI-POD NETWORK ENVIRONMENT

TECHNICAL FIELD

This disclosure relates in general to the field of communications and, more particularly, to multicast traffic distribution in a multi-pod network environment.

BACKGROUND

Data centers are increasingly used by enterprises for effective collaboration and interaction and to store data and resources. A typical data center network contains myriad network elements, including endpoints, load balancers, routers, switches, etc. The network connecting the network elements provides secure user access to data center services and an infrastructure for deployment, interconnection, and aggregation of shared resource as required, including applications, endpoints, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for multicast traffic distribution in a multi-pod network environment is provided and includes provisioning (e.g., configuring, specifying, arranging, organizing, etc.) a block of multicast group addresses for broadcast, unknown unicast and multicast (BUM) traffic distribution between pods in the multi-pod network, calculating a hash corresponding to a bridge domain (BD) extending across a plurality of pods in the multi-pod network, the hash being identically calculated at each one of the plurality of pod, indexing (e.g., indicating, pointing, characterizing, representing, etc.) with the hash into the block of multicast group addresses designated for inter-pod BUM traffic to derive a global multicast group identical for the broadcast domain across the plurality of pods, and associating a local multicast group at the translator with the derived global multicast group.

As used herein, a "pod" (also called a "point of delivery") refers to a deployable module (e.g., collection, portion, group, sub-system, etc.) of network, compute, storage, and application components (e.g., resources) that work together to deliver networking services. Each pod is under a common administrative control, with separate pods being controllable separately and independently. In some embodiments, the pods comprise repeatable patterns of resources facilitating increase in modularity, scalability and manageability of large networks, such as data centers.

Example Embodiments

Figure 1:
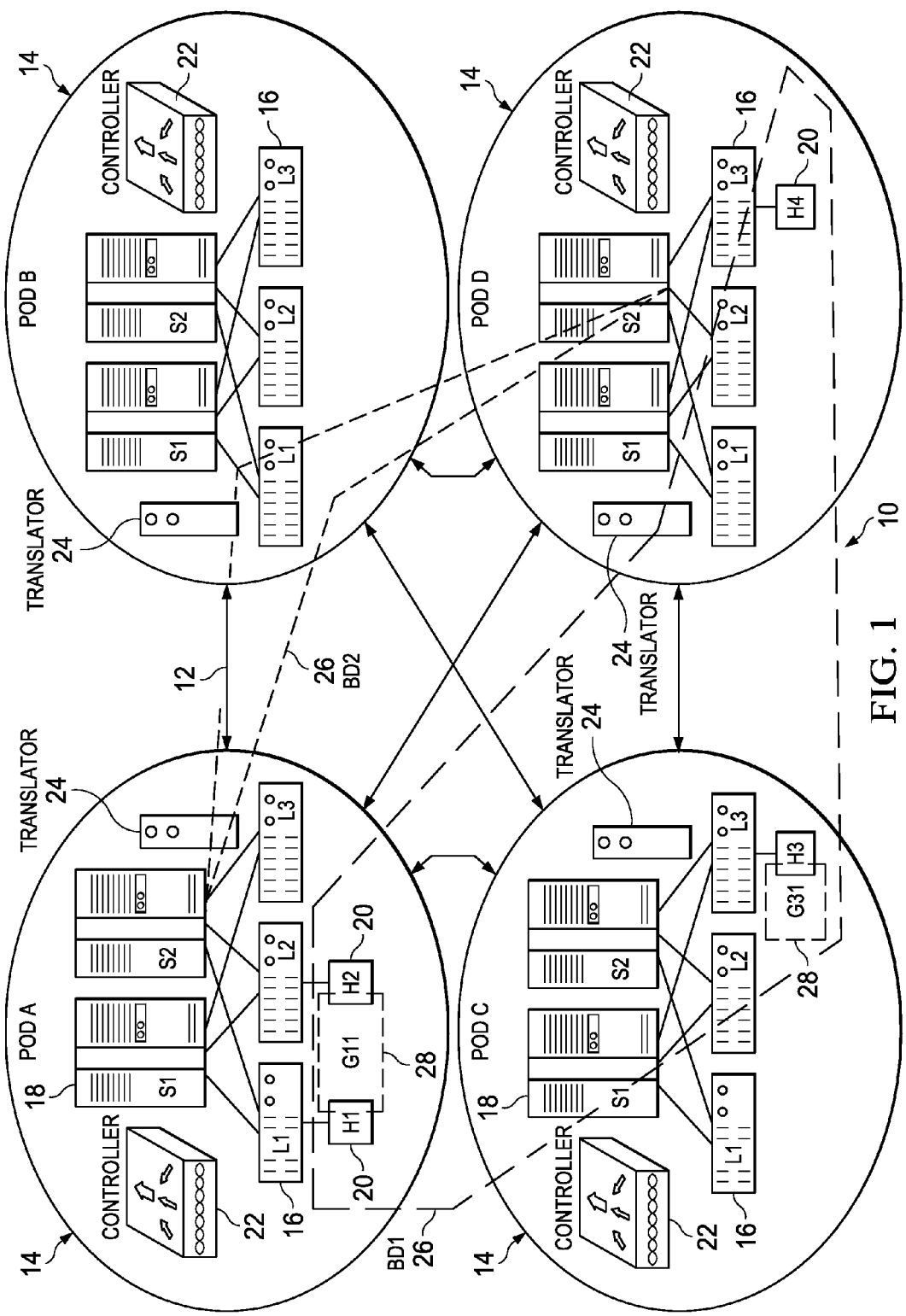
FIG. 1 is a simplified block diagram illustrating a communication system that facilitates multicast traffic distribution in a multi-pod network environment.

Turning to FIG. 1, FIG. 1 is a simplified block diagram illustrating a communication system 10 to facilitate multicast traffic distribution in a multi-pod network environment. FIG. 1 illustrates a multi-pod network 12 connecting a plurality of pods 14 (e.g., pod A, pod B, pod C). Note that any number of pods 14 may be provisioned in network 12 within the broad scope of the embodiments. Each pod 14 includes a fabric (e.g., network topology wherein nodes interconnect via switches) comprising a plurality of leaf switches 16 (e.g., L1, L2, L3) interconnected to spine switches 18 (e.g., S1, S2). Leaf switches 16 and spine switches 18 may be similar in a variety of ways; they are dissimilar in the devices to which they connect; whereas leaf switches 16 connect to endpoints 20 (e.g. H1) and to spine switches 18, spine switches 18 are connected to leaf switches 16 and to inter-pod network (IPN) 12. Endpoints 20 can comprise virtual or physical machines executing in network 12. For example, endpoints 20 may comprise application servers, database servers, client devices, etc. In various embodiments, each pod 14 includes a Layer 2 encapsulation over an underlying Layer 3 network, for example, using protocols such as Network Virtualization using Generic Routing Encapsulation (NVGRE), for example. On the other hand, the Layer 2 encapsulation over the underlying L3 network is not used between pods 14. Note that Layer 2 and Layer 3 refer to corresponding layers in the Open Systems Interconnect (OSI) model of networks.

Each pod 14 is under a common administrative control, for example, controlled by one or more controllers 22 establishing a common administrative zone. Thus, each pod 14 may be controlled by respective controller(s) 22 with separate network and other configurations. Pod 14 can conform to a standard operating footprint that shares the same failure domain; in other words, if something catastrophic happens in any one pod 14 (e.g., pod A), workloads running in that pod 14 are affected but neighboring workloads in a different pod 14 (e.g., pod B, pod C) are not affected.

Each pod 14 includes a translator 24 at its border; translator 24 receives incoming and outgoing traffic and redirects inter-pod traffic according to pre-configured rules and policies. In many embodiments, translator 24 may perform network address translation (NAT) and comprises one or more active units placed in traffic data path, for example, as a functional component of a border router or site gateway. Translator 24 intercepts Internet Protocol (IP) packets, and may forward each packet onward with or without alteration to the contents of the packet, or may elect to discard the packet. Translator 24 may differ from a conventional router or a firewall due to its discretional ability to alter the IP packet before forwarding it on. Further, translator 24 may be similar to a firewall, and different from a router, in its topological sensitivity: translator 24 has an "inside" (e.g., side facing into pod 14) and an "outside," (e.g., side facing away from pod 14) and undertakes different operations on intercepted packets depending on whether the packet is going from inside to outside, or in the opposite direction.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A network provider may build a network infrastructure (e.g., large data centers) to support cloud computing using multiple pods for fault tolerance. For example, an initial number of pods may be deployed to support expected demand. The pods, plus the aggregation and core, make up the initial cloud infrastructure. The network infrastructure is modeled in the service inventory so that tenant services can be provisioned and activated by a process known as on-boarding. The architecture and contents of the pod is generally determined by the individual network provider. Some providers use a pod comprised of an integrated compute stack that offers a pre-integrated set of compute, network, and storage equipment that operates as a single solution and is easier to buy and manage, offering capital expenditure and operational expenditure savings.

Typically, a virtualized data center architecture (e.g., with multi-pods) implements an overlay network over an underlay infrastructure. Nodes in the overlay network can be considered as being connected by virtual or logical links, each of which corresponds to a path (e.g., through multiple physical links) in the underlying network. Multiple overlay networks can be implemented over any network infrastructure and the underlay is used to carry the traffic to appropriate endpoints in the overlay network. The overlay network uses some form of encapsulation (e.g., indirection) to decouple a network service from the underlying infrastructure. Per-service state is restricted at the edge of the network and the underlying physical infrastructure of the core network has no or little visibility of the actual services offered. Such a layering approach enables the core network to scale and evolve independently of the offered services. In a general sense, such overly networks use protocols like Virtual Extensible Local Area Network (VXLAN), Stateless Transport Tunneling (STT), Network Virtualization using Generic Routing Encapsulation (NVGRE) or network virtualization overlays (NVO3) and run traffic between virtual switches. The underlay infrastructure implements the overlay by using an additional encapsulation over the overlay network's packets.

In a typical overlay network without multiple pods, tenant Broadcast, unknown Unicast, and Multicast (BUM) traffic is distributed in the network using an IP multicast group in the underlay. Network nodes interested in the traffic subscribe to the multicast group and originate traffic onto the multicast group in the underlay (e.g., Layer 3). Such interested network nodes become part of a Layer 2 broadcast domain in each pod, called the bridge domain (BD). In a general sense, the BD is a set of logical ports that share the same broadcast (e.g., flooding) characteristics. A single BD (identified by a unique BD identifier) can span one or more ports of multiple devices. Each node that is part of a specific BD (with its corresponding BD identifier, for example, BD1 or BD2) is configured with a corresponding BD interface.

In many embodiments, the Layer 2 BD is extended across the multi-pod network, for example, BD1 (with member nodes in pods A, C and D) and BD2 (with member nodes in pods A, B and D). Merely as an example and not as a limitation, endpoints H1, H2 in pod A, endpoint H3 in pod C, and endpoint H4 in pod D may be members of BD1 that spans across pods A, C and D in network 12. Note that any number of BDs may be provisioned in network based on particular needs.

When all network nodes in specific BD are in the same administrative domain (e.g., as is the case within each pod 14), the multicast group identifier for the BD may be assigned by the common administrator (e.g., controller 22 in pod A) and may be configured appropriately on the nodes (e.g., on H1 and H2). But in a multi-pod network topology, as in communication system 10, where each pod 14 is in a different administrative domain (e.g., pod A, pod B, pod C, pod D), assignment of multicast groups as a configuration option across all subscribed nodes of a specific BD (e.g., BD1 or BD2) is not viable. For example, in BD1, endpoints H1, H2 are controlled by controller 22 in pod A, whereas endpoint H3 is controlled by controller 22 in pod C, and endpoint H4 is controlled by controller 22 in pod D, each with respectively different administrative and network configurations. Also, assigning one group per BD may waste resources in the inter-pod network.

Furthermore, in a multi-tenant environment, a tenant administrator (e.g., a user who exports service names, etc.) is usually different from a fabric administrator (e.g., another user who controls resources of the fabric such as group addresses, etc.). In a multi-pod network with multi-tenants, with no one central administrator, it may be difficult for the various network administrators to come to a common understanding on assignment of specific groups to particular BDs or services.

Embodiments of communication system 10 can resolve such issues (among others) to facilitate multicast traffic distribution in a multi-pod network environment. According to various embodiments, a separate global multicast group 26 (also referred to as global group for the sake of brevity) in Layer 3 may be provisioned for each inter-pod BD in network 12, correlating to disparate local multicast groups 28 (also referred to as local groups for the sake of brevity) within individual pods 14. Members of global multicast group 26 include pods 14, whereas members of local multicast group 28 includes endpoints. Thus, BD1 stretching across pods A, C and D may correlate to global multicast group G120 among pods A, B and C, and to local multicast group G11 within pod A, and local multicast group G31 within pod C; and so on. Thus, each BD is associated with various intra-pod local multicast groups 28 in each member pod 14 and at least one inter-pod global multicast group 26 comprising member pods 14.

According to various embodiments, a block of IP multicast group addresses for global multicast groups 26 for the purpose of the BUM traffic distribution between pods 14 is provisioned in network 12. In some embodiments, each pod 14 uses a hash on a network service name (e.g., BD Name), or other such parameter having the same value across all pods 14 for each logical BD stretched across multiple pods 14 to derive global multicast group 26. For example, assume that BD1 stretching across pods A, C and D is called Tenant1/Coke/BD1; the same hash algorithm computed on Tenant1/Coke/BD1 at pods A, C, and D results in the same hash value at pods A, C and D.

In other embodiments, each pod 14 can include a map of local BDs extended to other pods 14. For example, pod A may include a map of BD1 indicating membership of pods C and D in BD1; pod A may include another map of BD2 indicating membership of pods B and D in BD2. The map may be derived by configuration, interaction with an orchestrator in network 12, via other control plane mechanisms such as Border Gateway Protocol (BGP) Multiprotocol Label Switching (MPLS) based Ethernet Virtual Private Network (EVPN), or other suitable mechanisms based on particular needs. In some embodiments, the BD membership map specifies a combination of site-ID and pod-ID (e.g., site 1, pod A; site 1 pod B; site 2, pod C; etc.) where the BD is extended. According to one embodiment, each pod 14 derives a hash from the set of {site-ID/pod-ID} where the BD is extended.

According to various embodiments, the hash is used to index into the block of multicast group addresses designated for inter-pod BUM traffic. In an example embodiment, the hash value may serve as a pointer for a memory location of the corresponding multicast group address designated for the specific inter-pod BUM traffic of the associated BD. For example, the hash computed over BD1 may be indexed to global multicast group 120; BD1 may correspond to local multicast group 11 in pod A, to local multicast group G31 in pod C, and to local multicast group G41 in pod D. Likewise, the hash computed over BD2 (extending across pods A, B and D) may be indexed to global multicast group 130; BD2 may correspond to local multicast group 21 in pod A, to local multicast group 43 in pod B; and so on. Thus, each BD may be uniquely associated with a hash value, which indexes into a common global multicast group 26 among interested pods 14 and the BD may correspond to various different local multicast groups 28 within interested pods 14.

Because the BD parameter (e.g., BD name; BD membership map; etc.) over which the hash is computed is common across interested pods 14 and the multicast group block is common across interested pods 14, each pod 14 derives the same group ID for each BD using the common hash algorithm. Thus, instead of configuring each pod 14 separately with the relevant multicast groups, each pod 14 is configured with the common hash algorithm, such that computing the hash over a common inter-pod parameter results in the same multicast group identifier in network 12. Each pod 14 subscribes to derived global multicast group 26 in network 12 and also originates BUM traffic for the BD onto derived global multicast group 26.

In embodiments where the BD membership map is used to derive the hash, each pod 14 may advertise global multicast group 26 assigned to the specific BD in that pod 14 to other member pods 14 via a control plane (e.g., in a EVPN control plane, using an Inclusive Multicast Ethernet Tag (IMET) route). For example, pod A may advertise that GP1 is assigned to BD1 and GP2 is assigned to BD2 at pod A. If pods A, C and D have consistent maps of member pods A, C, and D of BD1, each member pod A, C, and D arrives at the same group address to BD mapping (e.g., GP1:BD1). Thus, in such embodiments, advertisements received from remote pods 14 may match global multicast group 26 derived locally from the BD membership maps.

Nevertheless, there may be scenarios in which the BD membership map may not be consistent across all pods 14 (e.g., during a time window when a new pod 14 is added or deleted from the BD during a configuration change). During such scenarios, locally derived global multicast group 26 may not match global multicast group 26 advertised by remote pods 14; therefore, some control plane advertisements received at local pod 14 may not match locally derived global multicast group 26 for the applicable BD. Each pod 14 may subscribe (e.g., via Internet Group Management Protocol (IGMP)) to the all unique global multicast groups 26 either derived or advertised remotely for the applicable BD; however, traffic may be originated using locally derived multicast group 26.

After the BD map becomes consistent across pods 14 (e.g., after configuration changes have been rolled out to all pods 14), steady state is reached when pods 14 are using the same global multicast group 26 to originate and receive BUM traffic for the applicable BD. Thus, one global multicast group 26 is assigned for every unique set of pod IDs (or combinations of {site IDs/pod IDs}). If it is desired to use multiple global multicast groups instead of one global multicast group for each set of {site IDs/pod IDs} (e.g., to achieve better load balancing of traffic across multiple links), a second level hash (e.g., based on BD service name) can be used to expand and select from a set of global multicast groups 26 for each set.

Consider, merely for the sake of explanation, translator 24 in pod A. In an example embodiment, translator 24 provisions a block of multicast group addresses for BUM traffic distribution between pods 14 in multi-pod network 12. The provisioning may be performed by an administrator at controller 22 and propagated to translator 24 in some embodiments. In other embodiments, the block of multicast group addresses may be provisioned directly on translator 24. Translator 24 calculates a hash corresponding to a BD extending across plurality of pods 14 in multi-pod network 12, the hash being identically calculated at each one of plurality of pods 14. Translator 24 indexes with the hash into the block of multicast group addresses designated for inter-pod BUM traffic to derive a global multicast group 26 that is identical for the BD across plurality of pods 14. Translator 24 associates local multicast group 28 at translator 24 with the BD.

In an example embodiment, associating local multicast group 28 with the BD comprises using a segment identifier in the overlay header to derive local multicast group 28. In some scenarios, a hash based on the outer group address may not be sufficient to derive local multicast group 28 as multiple local multicast groups or BDs can map to the same global multicast group (e.g., in a membership based approach). Even in the name based approach, as described herein, there can be hash collisions leading to the same global multicast group for multiple local multicast groups. Moreover, because the size (e.g., number) of the local multicast groups is not the same as the external groups pool, collisions may be unavoidable, with many local groups indexing to the same hash value. In other words, merely using the hash could lead to multiple local groups that map to the same global group. Therefore, local multicast group 28 is derived from the overlay header fields, which are not used in packets traversing IPN 12, but are used for distribution in each pod 14. Because of the 1:1 mapping between the BD and local multicast group 28, translator 24 may use the segment identifier in the overlay header to derive local multicast group 28.

The BD is associated with global multicast group 26 between plurality of pods 14 and a separate local multicast group 28 within each pod 14 in plurality of pods 14. Computing the hash comprises calculating the hash over a BD parameter common to plurality of pods 14. In some embodiments, the BD parameter can comprise a BD name (or other common BD identifier). In other embodiments, the BD parameter comprises a BD membership map including a list of plurality of pods 14 over which the BD extends. The BD membership map can comprise a set of combinations of site identifier and pod identifier of each one of plurality of pods 14.

During operation, assume that translator 24 receives a packet from outside pod A with an underlay header indicating a specific global multicast group 26 corresponding to a specific BD. A tunnel endpoint may insert an appropriate overlay header on the packet. Translator 24 determines the BD corresponding to the packet (e.g., based on the overlay segment identifier), derives the local group based on the BD, rewrites the underlay header to replace global multicast group 26 with local multicast group 28, and distributes the packet among locally interested endpoints 20 in pod A. In some embodiments, translator 24 determines local multicast group 28 using a Virtual Network ID (VNID) in the overlay header of the packet (e.g., along with the source IP address).

In another example scenario, assume that translator 24 receives a packet from inside pod A with an underlay header indicating local multicast group 28. Translator 24 determines the hash corresponding to the BD indicated in the packet's overlay header, indexes with the hash into global multicast group 26, rewrites the header to replace local multicast group 28 with global multicast group 26 and distributes the packet among interested pods 14.

Embodiments of communication system 10 can facilitate achieving multicast connectivity with minimal configuration or state sharing between pods 14. In one example embodiment, two common parameters, BD name (or other common BD identifier) and block of multicast groups 26 are used to allow each pod 14 to arrive at a consistent BD to group mapping in the inter-pod network. In another example embodiment, global multicast groups 26 may be derived from the BD membership maps in a distributed fashion with minimal coupling between pods 14. Optimal forwarding trees of BUM traffic distribution based on interested pods may be achieved with such schemes.

Turning to the infrastructure of communication system 10, the network topology can include any number of servers, hardware accelerators, virtual machines, switches (including distributed virtual switches), service nodes, routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Figure 2:
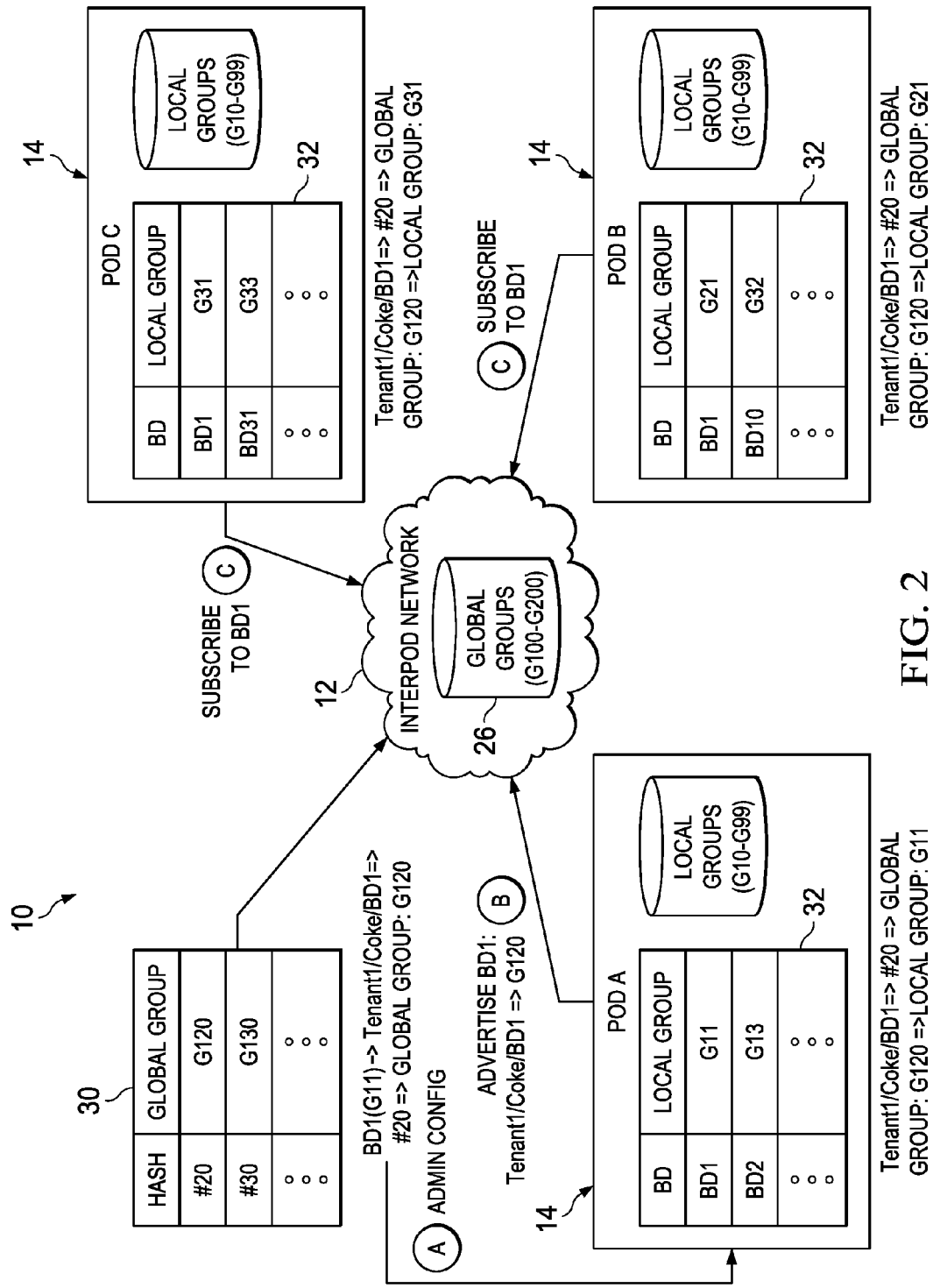
FIG. 2 is a simplified block diagram illustrating example details of embodiments of the communication system.

Turning to FIG. 2, FIG. 2 is a simplified block diagram illustrating example details according to an embodiment of communication system 10. Network 12 may be provisioned with a block of global multicast groups 26, for example, global multicast groups G100-G200. A hash may index to a specific global multicast group 26 according to a global hash index 30. For example, hash #20 indexes into global multicast group G120; hash #30 indexes into global multicast group G130; and so on. Each pod 14 (e.g., pods A, B and C) may be provisioned with local multicast groups 28 (e.g., for intra-pod BUM traffic). The BD may index to a specific local multicast group 28 according to a local BD index 32. For example, global multicast group G120 may correspond to BD1 at pod A indexing into local multicast group G11, G21 at pod B, G31 at pod C; and so on. Note that the group numbers and hash values are presented merely as examples and are not intended to be limitations.

For example, an administrator at pod A may provision a specific BD, namely BD1 locally therein. BD1 may be assigned a BD name such as Tenant1/Coke/BD1. A hash value computed over BD name Tenant1/Coke/BD1 may indicate a hash of #20, which indexes to global multicast group G120 according to global hash index 30. BD1 may be associated (e.g., manually or automatically) to local multicast group G11 at pod A according to local BD index 32. Note that pod A may be configured with any number of other local multicast groups for intra-pod and inter-pod BUM traffic.

Pod A may advertise BD1 as Tenant1/Coke/BD1 in network 12. Pods B and C may subscribe to Tenant1/Coke/BD1. Pods B and C may separately and independently compute the hash over BD name Tenant1/Coke/BD1, and derive, independently and separately, identical global multicast group G120 based on the computed hash. Pods B and C may be configured separately with local multicast groups 28 that form a one-to-one relationship with BD1 according to respective local BD index 32.

Assume, merely for purposes of explanation, and not as a limitation, that a packet is sent by pod A in local multicast group G11. Translator 24 (not shown) at pod A receives the packet, and looks up local BD index 32 or the segment identifier in the overlay header of the packet to determine the corresponding BD and computes the hash corresponding to the BD; the hash is then used to index into global hash index 30 to determine global multicast group G120 corresponding to local multicast group G11. Translator 24 rewrites the header of the packet to indicate a destination group of G120 and transmits the packet to other interested pods in network 12.

Pod B receives the packet, and translator 24 at pod B derives local multicast group G21 corresponding to the BD referenced in the segment identifier of the overlay header using local BD index 32. Translator 24 at pod B rewrites the header of the packet to indicate a destination group of G21 and transmits the packet to interested endpoints in pod B.

Similarly, Pod C receives the packet, and translator 24 at pod C B derives local multicast group G31 corresponding to the BD referenced in the segment identifier of the overlay header using local BD index 32. Translator 24 at pod C rewrites the underlay header of the packet to indicate a destination group of G31 and transmits the packet to interested endpoints in pod C.

Figure 3:
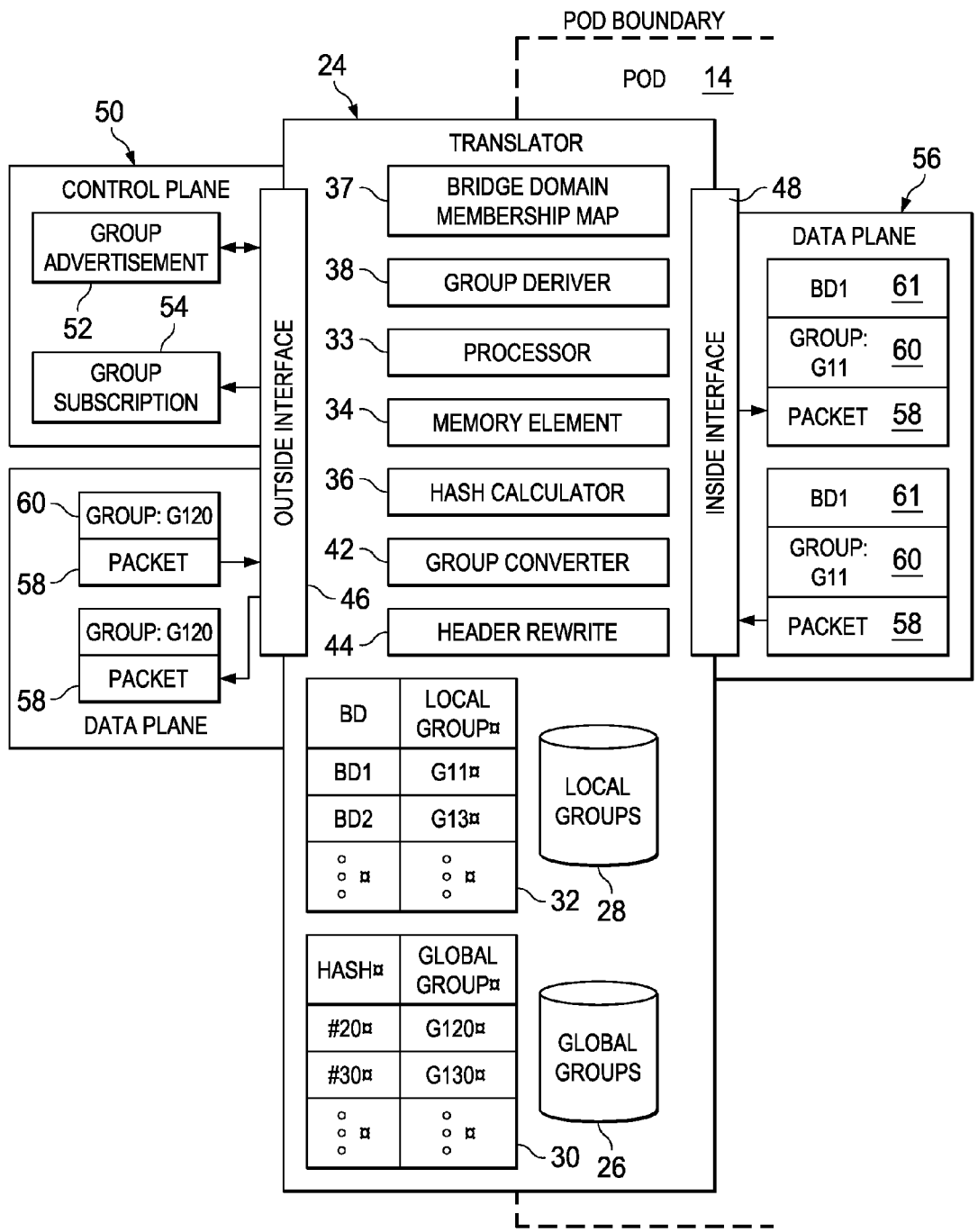
FIG. 3 is a simplified block diagram illustrating other example details of embodiments of the communication system.

Turning to FIG. 3, FIG. 3 is a simplified block diagram illustrating example details according to an embodiment of communication system 10. Translator 24 sits (e.g., is located; is provisioned in a router; etc.) at a pod boundary (e.g., network edge) of example pod 14. Translator 24 includes global hash index 30, local BD index 32, processor 33, a memory element 34, a hash calculator 36, a bridge domain membership map 37, a group deriver 38, a database (e.g., table, storage, etc.) of local multicast groups 26, another database (e.g., table, storage, etc.) of global multicast groups 28, a group converter 42, a header rewrite [module] 44, an outside interface 46 and an inside interface 48. Note that global hash index 30 and local BD index 32 may be combined into a single table or memory array where the hash value is used to index into global multicast group 26 based on the packet flow direction (e.g., into or out of pod 14).

Translator 24 sends and receives, on its control plane 50, at its outside interface 46, group advertisement 52 (e.g., messages advertising one or more BDs in network 12 outside pod 14; group advertisement 52 sent by translator 24 indicates the BD of interest to pod 14; group advertisement 52 may be indiscriminately received by translator 24 irrespective of pod 14's interest in the BD advertised therein). Translator 24 sends, on its control plane 50, group subscription 54 (e.g., messages subscribing to one or more BDs in network 12 outside pod 14).

Translator 24 sends and receives, on its data plane 56, at its outside interface 46, packets 58 of various global multicast groups 26 of interest to pod 14, with respective underlay (e.g., IP) headers 60. For example, after pod 14 subscribes to a specific global multicast group G120 in the inter-pod network, translator 24 receives packet 58 of global multicast group G120, with its underlay header 60 indicating global multicast group G120 to which it belongs. Similarly, translator 24 sends and receives, on its data plane 56, at its inside interface 48, packets 58 of various local multicast groups 28 of interest to pod 14, with respective overlay headers 61 indicating the BD and underlay (IP) header 60 indicating the local group. For example, after endpoints in pod 14 subscribe to a specific local multicast group G11 inside pod 14, translator 24 receives packet 58 of local multicast group G11, with its underlay (IP) header 60 indicating local multicast group G11 to which it belongs and overlay header 61 indicating BD1 as the bridge domain.

In a general sense, control notifications (e.g., group advertisement 52 and group subscription 54) may be communicated along control plane 54 using control plane protocols, which may be slower than data plane protocols used in data plane 56. Note that control plane 54 and data plane 56 are logically separated through their respective, different protocols. Moreover, control plane 54 may comprise a router component that focuses on how a specific router or switch (e.g., router on which translator 24 executes) interacts with its peers with state exchange, using specific control plane protocols, such as Border Gateway Protocol (BGP) and Open Shortest Path First (OSPF). The control plane functions typically include system configuration, management, and exchange of routing table information (e.g., as in group advertisements and subscriptions). Packets sent over control plane 54 comprise network device generated or received packets that are used for creation and operation of network 12. Thus, control plane packets can be used to exchange topology information with other routers and construct a routing table based on a routing protocol, for example, Routing Information Protocol (RIP), OSPF, or BGP. Because control functions are not performed on each arriving individual packet, they do not have a strict speed constraint and are implemented in software in general (e.g., using a general purpose or custom processor, such as a router processor). In a general sense, control plane 54 feeds data plane 56 with information required to create data forwarding tables and to update topology changes as they occur.

Data plane 56 (also called forwarding plane) comprises a router component that determines what to do with packets arriving on an inbound interface of the router. Data plane 56 comprises to one or more table(s) in which the router looks up the destination address of the incoming packet and retrieves information necessary to determine the path from the receiving interface, through the internal forwarding fabric of the router, to the proper outgoing interface(s). Typically, data plane 56 is implemented in a high speed Application Specific Integrated Circuit (ASIC), and has the responsibility of parsing packet headers, filtering, encapsulations, queuing, etc. Typically, data plane operations are faster than control plane operations.

Assume, merely for example purposes and not as a limitation, that pod 14 is subscribed to a specific BD (e.g., BD1 with name Tenant1/Coke/BD1) through appropriate group advertisement 52 (e.g., in the case where pod 14 is initially configured with the interested BD1) or group subscription 54 (e.g., in the case where pod 14 responds to the appropriate advertisement for BD1). In either case, in some embodiments, hash calculator 36 calculates the hash over the BD name (e.g., Tenant1/Coke/BD1). In some other embodiments, hash calculator 36 calculates the hash using BD membership information from BD membership map 37. Group deriver 38 derives global multicast group 26 (e.g., G120) corresponding to BD1 based on the calculated hash and global hash index 30. Group deriver 38 derives local multicast group 28 (e.g., G11) corresponding to BD1 based on the BD identifier in the overlay header and local BD index 32, wherein the BD and local multicast group 28 may be associated.

Subsequently, translator 24 receives at outside interface 46, packet 58 with underlay header 60 indicating global multicast group G120. A tunnel endpoint (not shown) may insert appropriate overlay header 61 on packet 58 based on various mappings that are not relevant to the discussion at hand. Group converter 42 indexes into local BD index 32 using the BD identifier in overlay header 61 and identifies local multicast group G11. Header rewrite module 44 rewrites underlay header 60 of received packet 58 to indicate local multicast group G11, and transmits packet 58 to locally interested endpoints in pod 14 through inside interface 48.

Translator 24 may also receive packet 58 at inside interface 48, indicating local multicast group G11 in underlay header 60 and BD in overlay header 61. Group converter 42 identifies the BD indicated in overlay header 61. Hash calculator 36 calculates the hash corresponding to the BD, indexes into global hash index 30 using the hash value and identifies global multicast group G120. The tunnel endpoint may decapsulate overlay header 61 from outgoing packet 58. Header rewrite 44 rewrites underlay header 60 of packet 58 to indicate global multicast group G120, and transmits packet 58 to interested pods 14 in network 12 through outside interface 46.

Figure 4:
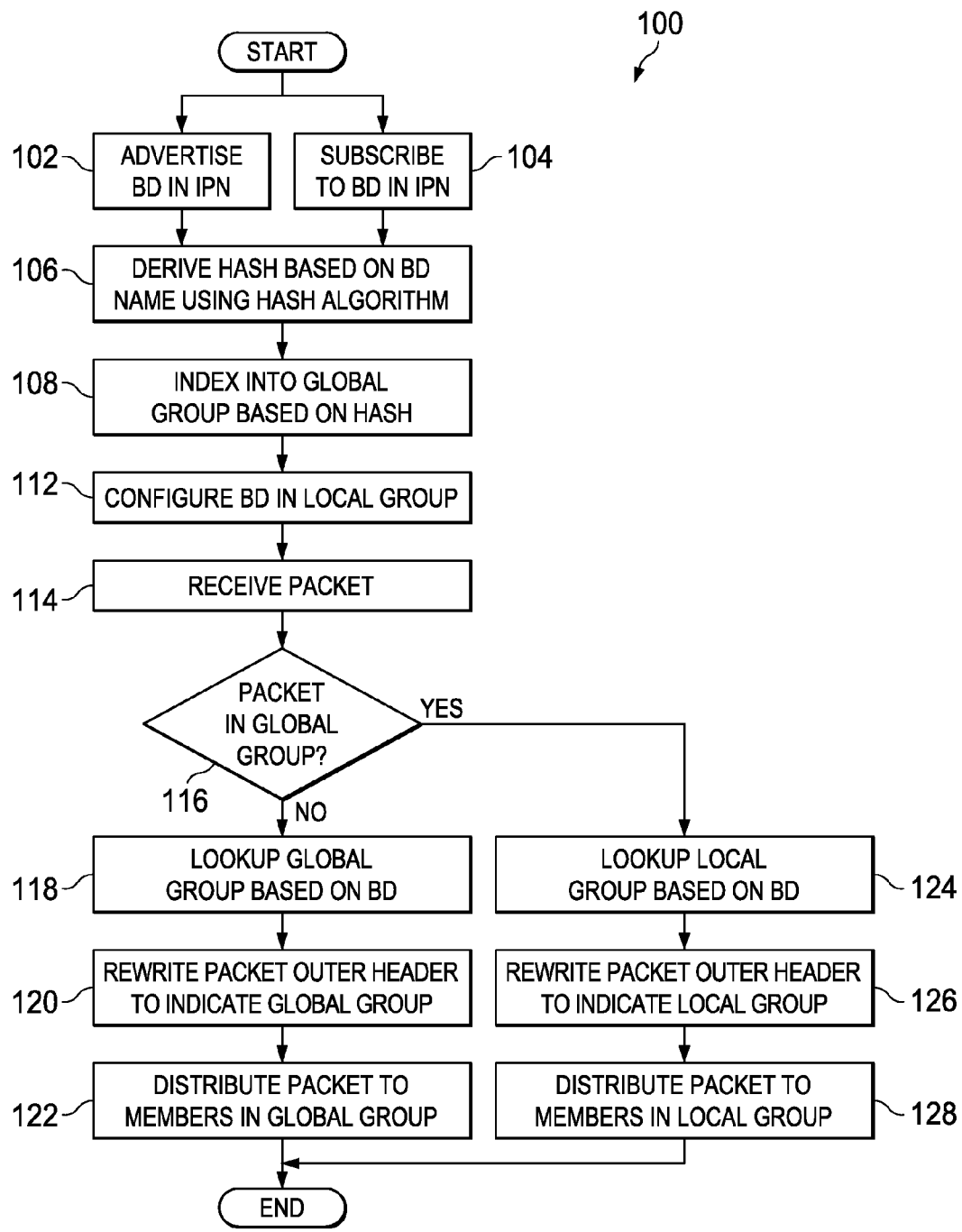
FIG. 4 is a simplified flow diagram illustrating example operations that may be associated with an embodiment of the communication system.

Turning to FIG. 4, FIG. 4 is a simplified flow diagram illustrating example operations 100 that may be associated with an embodiment of communication system 10. At 102, pod 14 may advertise a specific BD (e.g., BD1) in network 12, external to pod 14. Alternatively, at 104, pod 14 may subscribe to a specific BD (e.g., BD1) in network 12. At 106, translator 24 may derive a hash value based on the BD name (or other common BD identifier) using the hash algorithm configured thereon. At 108, translator 24 may index into global multicast group 26 based on the calculated hash. At 112, the advertised/subscribed BD (e.g., BD1) may be configured in a local multicast group 28 in pod 14.

At 114, translator 24 may receive packet 58. At 116, a determination may be made whether packet 58 is in global multicast group 26, for example, based on inspection of underlay header 60. If packet 58 is not in global multicast group 26, but is in local multicast group 28 and destined to outside pod 14, at 118, translator 24 may identify the BD associated with the local multicast group, for example, using the segment identifier in overlay header 61, calculate the hash value based on the BD, and index into global hash index 30 to determine corresponding global multicast group 26. At 120, translator 24 may rewrite underlay header 60 to indicate appropriate global multicast group 26. A tunnel endpoint may decapsulate overlay header 61 from packet 58. At 122, translator 24 may distribute packet 58 to members in global multicast group 26. For example, the distribution may involve making multiple copies of packet 58 and sending the multiple copies to various pods 14. Other mechanisms for distribution may also be included within the broad scope of the embodiments.

Turning back to 116, if packet 58 is in global multicast group 26, and destined to within pod 14, at 124, the tunnel endpoint may insert overlay header 61, and translator 24 may identify the BD based on the segment identifier in overlay header 61, and index into local BD index 32 to determine local multicast group 28. At 126, translator 24 may rewrite header 60 to indicate appropriate local multicast group 28. At 128, translator 24 may distribute packet 58 to members in local multicast group 28 within pod 14.

Figure 5:
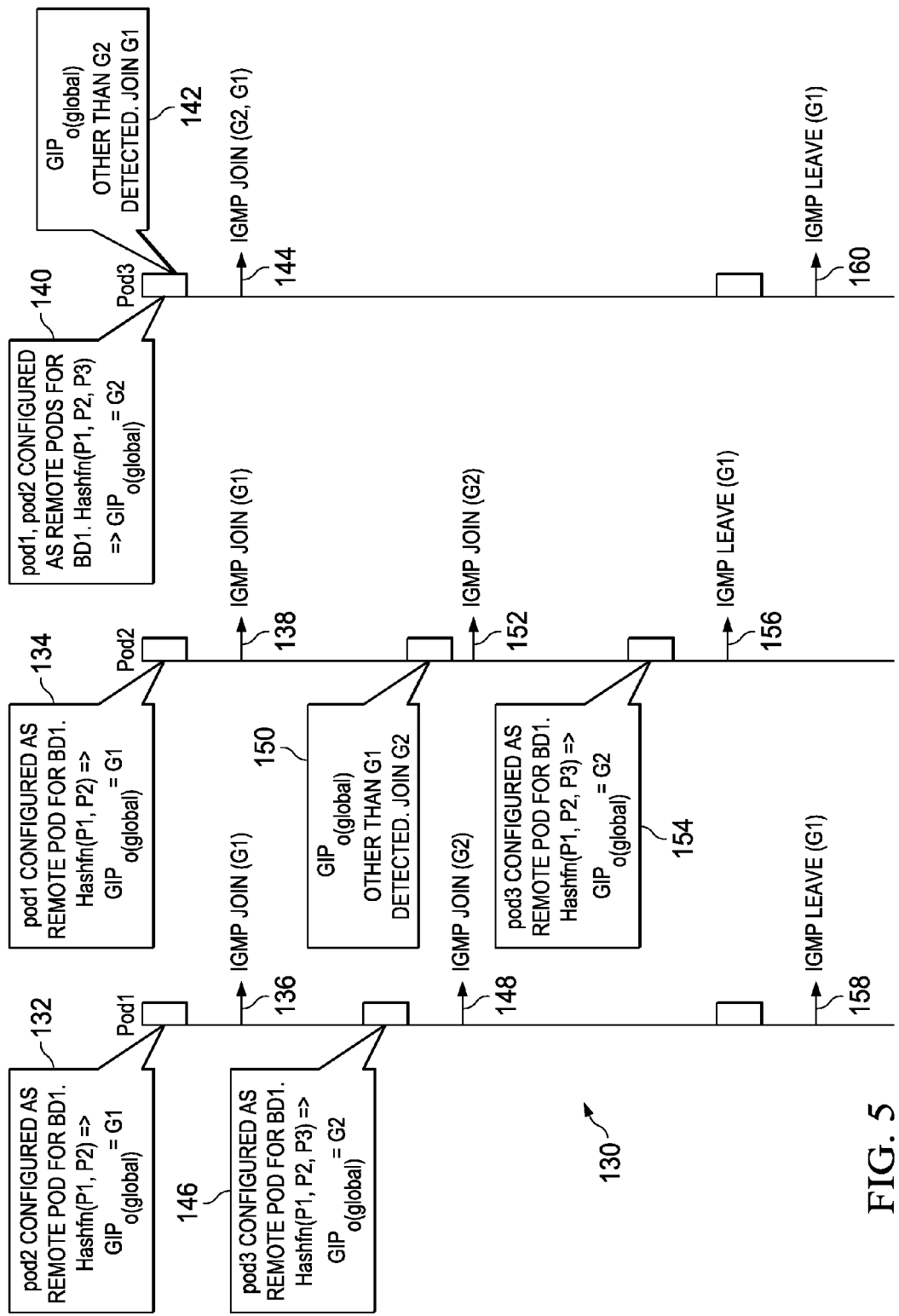
FIG. 5 is a simplified sequence diagram illustrating other example operations that may be associated with an embodiment of communication system.

Turning to FIG. 5, FIG. 5 is a simplified sequence diagram illustrating example operations 130 that may be associated with an embodiment of communication system 10. Assume that network 12 includes three pods, pod1, pod2, and pod3. At 132, pod1 receives a notification that pod2 is configured as a remote pod for a specific BD (e.g., BD1). The notification may be through a configuration change, advertisement, or other suitable mechanism. Pod 1 calculates a hash value based on BD membership of pod1 (P1) and pod2 (P2), which indexes to global multicast group G1. At 134, pod 2 receives a notification that pod1 is configured as a remote pod for BD1. Pod 2 calculates a hash value based on BD membership of pod1 (P1) and pod2 (P2), which indexes to the same global multicast group G1 as derived by pod1, because the hash algorithm and the BD membership map are consistent between pod1 and pod2. At 136, pod1 sends out an Internet Group Management Protocol (IGMP) message indicating that it is joining global multicast group G1. At 138, pod2 sends out an IGMP message indicating that it is joining global multicast group G1. Pod1 and pod2 send and receive messages on group G1.

At 140, pod3 receives notification (e.g., from IGMP messages) that pod1 and pod2 are configured as remote pods for BD1. Pod3 is also configured to join BD1. Pod3 computes a hash based on BD membership of pod1, pod2 and pod3 (P3), indexing into another global multicast group G2 based on the computed hash value. At 142, pod3 detects another group G1, besides G2 for BD1 and joins G1. At 144, pod3 sends out an IGMP message indicating that it is joining groups G1 and G2. Pod3 sends and receives messages in G2, but only receives messages (e.g., does not send out messages) in group G1 (e.g., because it has not locally derived the hash value for G1).

At 146, pod1 receives notification that pod3 is configured as another remote pod for BD1. Pod1 computes the hash value over the updated BD membership comprising pod1, pod2 and pod3 and indexes into the same global multicast group as derived by pod3, namely group G2. At 148, pod1 sends out an IGMP message indicating that it is joining G2. Pod1 sends and receives messages in G1 and G2. At 150, pod2 detects another group G2, besides G1 for BD1 and joins G2. At 152, pod2 sends out an IGMP message indicating that it is joining G2. Pod2 sends and receives messages in G1, but only receives messages (e.g., does not send out messages) in group G2 (e.g., because it has not derived the hash value for G2). At 154, pod2 receives notification that pod3 is configured as a remote pod for BD1. Pod2 computes the hash value over the updated BD membership comprising pod1, pod2 and pod3 and indexes into the same global multicast group as derived by pod1 and pod3, namely group G2. Pod2 thereafter sends and receives messages in G1 and G2.

At this point, BD membership map is consistent across pod1, pod2 and pod3, and the updated membership corresponds to group G2, although group G1, with the incorrect membership is continuing to be used by pod1, pod2, and pod3. At 156, pod2 sends out an IGMP message indicating that it is leaving G1. At 158, pod1 sends out an IGMP message indicating that it is leaving G1. At 160, pod3 sends out an IGMP message indicating that it is leaving G1. At this point, BD membership map is consistent across pod1, pod2 and pod3, and the updated membership corresponds only to group G2, with no other overlapping groups. Note that although the example operations have been described with reference to three pods, any number of pods may be involved within the broad scope of the embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, translator 24. In some embodiments, one or more of these features may be implemented in hardware, for example, translator 24, provided external to these elements, or consolidated in any appropriate manner to achieve the intended functionality. The various network elements in pod 14 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, translator 24 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 34) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 33) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a hardware translator in a multi-pod network environment, the hardware translator including a processor configured to execute instructions in the multi-pod network environment, the method comprising:

provisioning, at the processor, a block of multicast group addresses for broadcast, unknown unicast and multicast (BUM) traffic distribution between pods in the multi-pod network;
calculating, at the processor, a hash corresponding to a bridge domain (BD) extending across a plurality of pods in the multi-pod network, the hash being identically calculated at each one of the plurality of pods;
indexing, at the processor, with the hash into the block of multicast group addresses designated for interpod BUM traffic to derive a global multicast group identical for the BD across the plurality of pods; and
associating, at the processor, a local multicast group at the translator with the BD.

2. The method of claim 1, wherein a Layer 2 encapsulation over a Layer 3 network is used within each pod, and the Layer 2 encapsulation over the Layer 3 network is not used between pods.

3. The method of claim 1, wherein the BD is associated with the global multicast group between the plurality of pods and a separate local multicast group within each pod in the plurality of pods.

4. The method of claim 1, wherein computing the hash comprises calculating the hash over a BD parameter common to the plurality of pods.

5. The method of claim 4, wherein the BD parameter comprises a BD name.

6. The method of claim 4, wherein the BD parameter comprises a BD membership map including a list of the plurality of pods over which the BD extends.

7. The method of claim 6, wherein the BD membership map comprises a set of combinations of site identifier and pod identifier of each one of the plurality of pods.

8. The method of claim 1, wherein each pod comprises a fabric including a plurality of spine switches interconnected to leaf switches, wherein the leaf switches are connected to endpoints that generate or terminate packets in the network.

9. The method of claim 1, further comprising:
receiving a packet with an overlay header indicating a BD and an underlay header indicating the global multicast group;
determining the local multicast group corresponding to the BD indicated in the overlay header;
rewriting the underlay header of the packet to replace the global multicast group with the local multicast group; and
distributing the packet among locally interested endpoints.

10. The method of claim 1, further comprising:
receiving a packet with an underlay header indicating the local multicast group and an overlay header indicating the BD;
determining the hash corresponding to the BD;
indexing with the hash into the global multicast group;
rewriting the underlay header to replace the local multicast group with the global multicast group; and
distributing the packet among interested pods.

11. Non-transitory tangible media that includes instructions for execution, which when executed by a processor of a translator in a multi-pod network environment, is operable to perform operations comprising:
provisioning, at the processor, a block of multicast group addresses for broadcast, unknown unicast and multicast (BUM) traffic distribution between pods in the multi-pod network;
calculating, at the processor, a hash corresponding to a bridge domain (BD) extending across a plurality of pods in the multi-pod network, the hash being identically calculated at each one of the plurality of pods;
indexing, at the processor, with the hash into the block of multicast group addresses designated for interpod BUM traffic to derive a global multicast group identical for the broadcast domain across the plurality of pods; and
associating, at the processor, a local multicast group at the translator with the BD.

12. The media of claim 11, wherein a Layer 2 encapsulation over a Layer 3 network is used within each pod, and the Layer 2 encapsulation over the Layer 3 network is not used between pods.

13. The media of claim 11, wherein computing the hash comprises calculating the hash over a BD parameter common to the plurality of pods.

14. The media of claim 11, wherein the operations further comprise:
receiving a packet with an overlay header indicating a BD and an underlay header indicating the global multicast group;
determining the local multicast group corresponding to the BD indicated in the overlay header;
rewriting the underlay header of the packet to replace the global multicast group with the local multicast group; and
distributing the packet among locally interested endpoints.

15. The media of claim 11, wherein the operations further comprise:
receiving a packet with an underlay header indicating the local multicast group and an overlay header indicating the BD;
determining the hash corresponding to the BD;
indexing with the hash into the global multicast group;
rewriting the underlay header to replace the local multicast group with the global multicast group; and
distributing the packet among interested pods.

16. An apparatus in a multi-pod network environment, comprising:
a memory element for storing data; and
a processor, wherein the processor executes instructions associated with the data, wherein the processor and the memory element cooperate, such that the apparatus is configured for:
provisioning a block of multicast group addresses for broadcast, unknown unicast and multicast (BUM) traffic distribution between pods in the multi-pod network;
calculating a hash corresponding to a bridge domain (BD) extending across a plurality of pods in the multi-pod network, the hash being identically calculated at each one of the plurality of pods;
indexing with the hash into the block of multicast group addresses designated for inter-pod BUM traffic to derive a global multicast group identical for the broadcast domain across the plurality of pods; and
associating a local multicast group at the translator with the BD.

17. The apparatus of claim 16, wherein a Layer 2 encapsulation over a Layer 3 network is used within each pod, and the Layer 2 encapsulation over the Layer 3 network is not used between pods.

18. The apparatus of claim 16, wherein computing the hash comprises calculating the hash over a BD parameter common to the plurality of pods.

19. The apparatus of claim 16, further configured for:

receiving a packet with an overlay header indicating a BD and an underlay header indicating the global multicast group;

determining the local multicast group corresponding to the BD indicated in the overlay header;

rewriting the underlay header of the packet to replace the global multicast group with the local multicast group; and distributing the packet among locally interested endpoints.

20. The apparatus of claim 16, further configured for:

receiving a packet with an underlay header indicating the local multicast group and an overlay header indicating the BD;

determining the hash corresponding to the BD;

indexing with the hash into the global multicast group;

rewriting the underlay header to replace the local multicast group with the global multicast group; and distributing the packet among interested pods.

* * * * *